June 28, 1966    O. F. WHITE    3,258,200
INSECT REPELLING APPARATUS
Filed July 28, 1964

INVENTOR.
Odas F. White

BY
B. B. Olive
ATTORNEY

United States Patent Office 3,258,200
Patented June 28, 1966

3,258,200
INSECT REPELLING APPARATUS
Odas F. White, Box 833, Hillsboro, N.C.
Filed July 28, 1964, Ser. No. 385,645
1 Claim. (Cl. 230—241)

This invention relates to insect repellers and more particularly to an insect repeller having means to establish forced air circulation around a given area, such as a picnic area, sufficient to repel insects from the area.

It is known that a stream of air of sufficient velocity will not be penetrated by insects, such as flies, gnats, mosquitoes, and the like. Conventional electric fans have been employed, for example, in dairies where large numbers of flying insects are encountered. Insects and more particularly flying insects are bothersome around picnic areas. Swatters, fly-paper, and the like have helped control insects but such means of control are unsanitary and bothersome to use. Aside from the insect problem, it is desirable when employing electric fans to repel insects at picnics, to have means for shading the food and drinks and for protecting them from a direct blast of air.

An object of this invention is to provide an improved forced air apparatus for repelling insects and the like at a picnic area.

A further object of this invention is to provide forced air insect repeller apparatus for a picnic area which can be used both as an insect repeller and as shade for the area.

A further object of this invention is to provide a forced air insect repeller apparatus capable of being attached to or rolled in over a picnic table.

Other objects will become more evident upon reading the following description when taken in reference to the drawings, in which.

The invention generally provides an elevated, thin wall, cone-shaped member, having above it a driven propeller. The propeller revolves at a relatively high velocity in a horizontal plane about the axis of the cone, the base of which is large enough to cover a conventional picnic table. As the propeller turns, air is caused to move downwardly toward the picnic table over the outer surface of the cone. The propeller thus effectively establishes a cylindrical wall of disturbed air around the area beneath the cone. The velocity of the propeller can be controlled according to prevailing air velocity and type of insects. With suitable velocity, sufficient air will be moved to repel insects and the like from entering the picnic area. In addition to serving as a means for deflecting the air as described, the cone also serves the useful and practical purpose of shading such food and drink as reside in the picnic area and protecting them from any direct blast of air.

Figure 1:
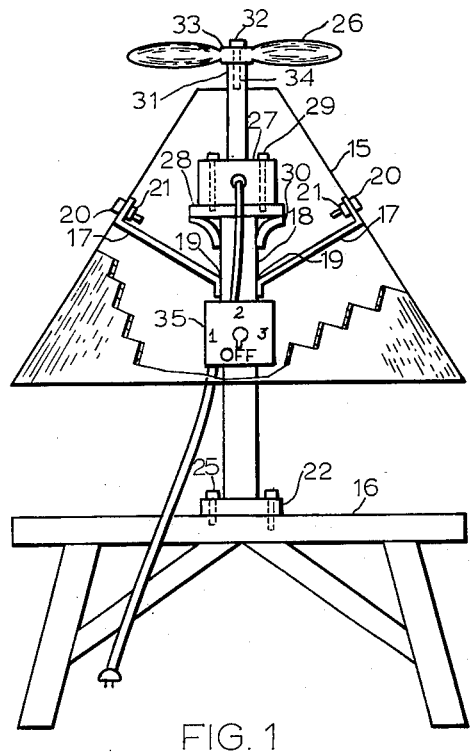
FIGURE 1 is a side elevation view of one embodiment of the insect repeller.
Figure 2:
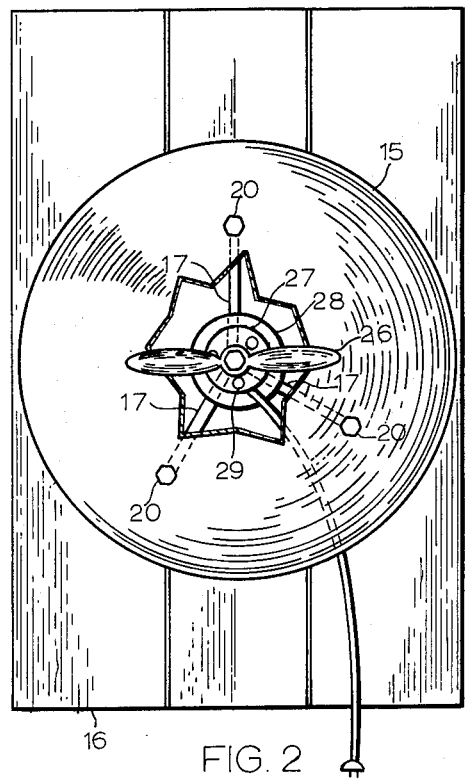
FIGURE 2 is a plan view of the insect repeller seen in FIGURE 1.

Describing the first embodiment of my invention illustrated in the accompanying FIGURES 1 and 2, inclusive, the previously mentioned cone member comprises in FIGURES 1 and 2 a thin wall, metallic, conical shaped member 15 hereafter referred to as cone 15. Cone 15 is supported in an upright and stable position above the picnic table 16 by means of suitable brackets 17 which are secured to a rigid post 18. Brackets 17 are secured at one end to post 18 by means of weld 19, and at the other end are secured to the cone 15 by means of bolts 20 and nuts 21 with the bolts 20 being engaged through the wall of cone 15 and brackets 17.

The complete insect repeller apparatus is secured to the picnic table 16 by means of a plate 22 welded to the post 18 through which pass suitable screws 25 secured to table 16. The cone 15 as described is thus capable of providing shade for the picnic table 16 and the description now proceeds to the air moving aspects of the invention.

A cylindrical wall of downwardly moving disturbed air is established around the area beneath the cone 15 by means of a propeller 26 which is driven by a motor 27. Motor 27 is mounted on a motor mount plate 28 by means of bolts 29, which extend through the motor housing and into the motor mount plate 28. The motor mount plate 28 is held in position by brackets 30 which are welded at one end to the motor mount plate 28 and at the other end to the rigid post 18. The motor 27 causes shaft 31 to rotate thereby rotating propeller 26 which is secured in position on shaft 31 by means of bolt 32 which extends through the hub 33 of the propeller 26 and is screwed into a tapped hole 34 in shaft 31.

The propeller 26 should turn rapidly and dependent on its size at a relatively high velocity. In order to adjust to various ambient wind conditions and insect conditions, motor 27 is selected to have a speed characteristic within the range of speeds desired responsive to the applied voltage. For example, with a cone having a base of 48 inches and a height of 30 inches, a 30-inch propeller rotating at 625 r.p.m. in relatively static ambient air was found to produce sufficient air flow to repel flies, gnats and mosquitoes. The applied voltage is controlled by a suitable voltage control 35 which may, for example, be any of the well known solid state feed back type speed controls, or with certain motors, a Variac voltage control may be applied. Thus, as ambient winds increase or decrease or as different kinds of insects are encountered, speed control 35 can be regulated to maintain effective repelling of the insects.

Figure 3:
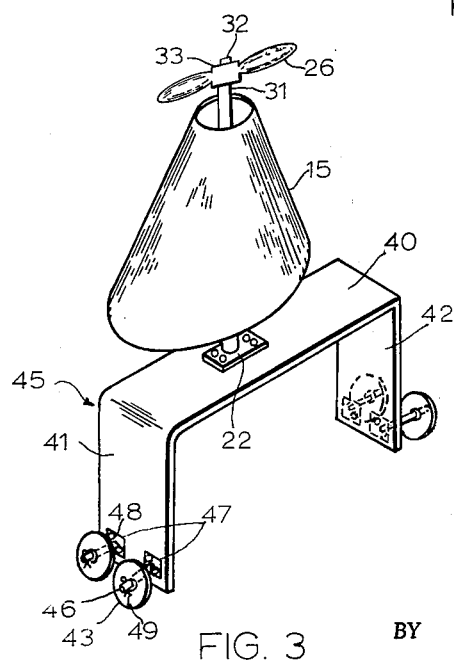
FIGURE 3 is a perspective view on a reduced scale of another embodiment of the insect repeller apparatus arranged as a mobile unit.

The embodiment of FIGURES 1 and 2 can be seen from the description thus far given to be directed to a fixed installation whereas FIGURE 3 next to be described is directed to an embodiment which enables the insect repelling and shading apparatus to be moved at will to any picnic table.

In FIGURE 3, plate 22 instead of being secured to the picnic table is secured to the top wall 40 of a bent, inverted, U-shaped sheet metal plate body having end walls 41, 42 and supporting wheels 43 which together form a type of cart designated 45. Cart 45 is designed to straddle the picnic table 16 such that the insect repeller apparatus can be moved over the picnic table and removed from the picnic table as desired. The cart body including the top 40 and end walls 41, 42 may be stamped by a suitable die from sheet metal and then formed into the shape shown by conventional methods.

The mentioned wheels 43 are mounted on axles 46 which are bolted to the body by means of brackets 47 and bolts 48. Cotter pins 49 retain the wheels on the axles. The remainder of the apparatus shown in FIGURE 3 is like that of FIGURES 1 and 2. That is, when cart 45 is positioned over the picnic table and motor 27 (not shown in FIGURE 3) is energized propeller 36 will turn and direct a downwardly moving wall of air as previously described.

In the embodiments shown and described, all of the shading is of course furnished by the cone 15. Additional shading can of course be provided by placing the insect repeller apparatus under a larger shelter such as a tent provided the air flow in and around the cone is not obstructed. For example, a tent approximating the height of the cone can be employed and a central opening can be left in the tent immediately above the cone so as to provide means for air to be drawn down and around the cone.

It is understood that the present disclosure has been made only by way of example and that numerous changes in the details of construction and the combination and arrangement of parts may be resorted to without departing from the spirit and scope of the invention hereinafter claimed.

What is claimed is:

A mobile insect repeller and shading apparatus for a picnic table comprising a thin wall, cone shaped, air deflecting member, post means secured to and supporting said member, an electric motor mounted on said post means beneath said member, an air propeller mounted above said member and connected to be driven at a relatively high velocity by said motor about the axis of said member, said propeller being effective when said motor is energized to cause air to flow on the outer surface of said member and thereby establish a wall of downwardly and rapidly moving air about the area below said member effective to repel insects therefrom and an inverted, U-shaped cart structure secured to said post means and supporting said apparatus, said cart structure being adapted to move over said table.

References Cited by the Examiner
UNITED STATES PATENTS

| | | | |
|---|---|---|---|
| 680,120 | 8/1901 | Brown | 230—274 |
| 761,215 | 5/1904 | Everest | 230—274 |
| 1,475,845 | 11/1923 | Mariani | 230—249.5 |
| 2,627,217 | 2/1953 | Hainke | 98—1 |
| 2,726,034 | 12/1955 | Lorenzo | 230—241 |
| 2,817,281 | 12/1957 | Schwan | 98—1 |

LAURENCE V. EFNER, *Primary Examiner.*